US007179384B2

(12) United States Patent
Moriarty et al.

(10) Patent No.: US 7,179,384 B2
(45) Date of Patent: Feb. 20, 2007

(54) CONTROL OF COOLING WATER SYSTEM USING RATE OF CONSUMPTION OF FLUORESCENT POLYMER

(75) Inventors: Barbara E. Moriarty, Palatine, IL (US); Narasimha M. Rao, Naperville, IL (US); Kun Xiong, Naperville, IL (US); Tzu-Yu Chen, Wheaton, IL (US); Shunong Yang, Naperville, IL (US); Mita Chattoraj, Warrenville, IL (US)

(73) Assignee: Nalco Company, Naperville, IL (US)

( * ) Notice: Subject to any disclaimer, the term of this patent is extended or adjusted under 35 U.S.C. 154(b) by 141 days.

(21) Appl. No.: 10/836,760

(22) Filed: Apr. 30, 2004

(65) Prior Publication Data

US 2005/0242042 A1 Nov. 3, 2005

(51) Int. Cl.
*C02F 5/10* (2006.01)
(52) U.S. Cl. .................. 210/698; 210/701; 422/3; 422/15; 422/16
(58) Field of Classification Search ............... 210/698
See application file for complete search history.

(56) References Cited

U.S. PATENT DOCUMENTS

| | | | |
|---|---|---|---|
| 4,783,314 A | 11/1988 | Hoots et al. | |
| 4,813,973 A | 3/1989 | Winnik et al. | |
| 4,999,456 A | 3/1991 | Fong | |
| 5,043,406 A | 8/1991 | Fong | |
| 5,128,419 A | 7/1992 | Fong et al. | |
| 5,171,450 A * | 12/1992 | Hoots | 210/701 |
| 5,260,386 A | 11/1993 | Fong et al. | |
| 5,408,022 A | 4/1995 | Imazato et al. | |
| 5,435,969 A | 7/1995 | Hoots et al. | |
| 5,720,884 A | 2/1998 | Wallace et al. | |
| 5,817,927 A | 10/1998 | Chen et al. | |
| 5,855,791 A | 1/1999 | Hays et al. | |
| 5,902,749 A | 5/1999 | Lichtwardt et al. | |
| 5,986,030 A | 11/1999 | Murray et al. | |
| 6,068,012 A | 5/2000 | Beardwood et al. | |
| 6,280,635 B1 | 8/2001 | Moriarty et al. | 210/745 |
| 6,312,644 B1 | 11/2001 | Moriarty et al. | |
| 6,344,531 B1 | 2/2002 | Murray et al. | |
| 6,369,894 B1 | 4/2002 | Rasimas et al. | |
| 6,587,753 B2 * | 7/2003 | Fowee | 700/266 |
| 6,645,428 B1 | 11/2003 | Morris et al. | |
| 2005/0025659 A1 | 2/2005 | Godfrey et al. | |

FOREIGN PATENT DOCUMENTS

GB 1141147 1/1969

OTHER PUBLICATIONS

"The Chemical Treatment of Cooling Water", Second Edition by James W. McCoy, © 1983 by Chemical Publishing Co., Inc., see Chapter 1, Principles of Open Recirculating Cooling Water Systems, pp. 1-20, Chapter III, Scaling and Fouling, pp. 48-81, Chapter VI, Operating Procedures, pp. 198-226, and Appendix, Glossary, pp. 268-273.
"Methods to Monitor and Control Scale in Cooling Water Systems", presented in 2001 at the National Association of Corrosion Engineers Meeting, by B.E. Moriarty, J.P. Rasimas, P.R. Young and J.E. Hoots.
Paul A. Burda and Brian A. Healy, "Application Of Expert Systems For Cooling Water Monitoring,", Corrosion 95, NACE Int'l Annual Conf. And Corrosion Show, Paper No. 255, pp. 255/1 to 255/20 (1995).
B.B. Grotefend, "Expert System For Water Treatment," FYI, Chemical Engineering Progress, published prior to Apr. 30, 2004.
D. Hartwick and V. Jovancicevic, "Approaches For Reducing Phosphorous In Cooling Water Programs," Corrosion 96, Paper No. 605, pp. 605/1 to 605/21 (1996).
J. E. Hoots, "Water Treatment Dosage Control And Relationship To Performance," Paper No. 260, Corrosion 95, NACE Int'l Annual Conference and Corrosion Show, Paper No. 260, pp. 260/1 to 260/11 (1995).
J.E. Hoots, et al., "High Cycle Cooling Tower Operation: Hurdles And Solutions," IWC-99-48, pp. 388 to 397, published prior to Apr. 30, 2004.
Jiri Krejcoves, et al., "The Use of Coumarin Derivatives In The Preparation Of Fluorescence-Labeled Poly[N-2-(Hydroxypropyl)methacrylamide]," *Collection Czechoslov. Chem. Commun.* vol. 45: pp. 727 to 731 (1980).
James R. Macdonald et al., A New Method To Control Cooling Water Chemistry., Presented At AICHE Conference, Apr. 1989.
Barbara E. Moriarty, et al., "Monitoring Polymeric Treatment Programs In Alkaline Cooling Water," Presented At Corrosion '89 Meeting, pp. 1 to 14, Apr. 1989.
Nalco Chemical Co. Case Study TRASAR™, "Technology Shows Dramatic Improvement In Program Control At A Mid-South Chemical Plant,", CH-209 (1988).
Nalco Chemical Co., "Nalco TRASAR™ Technology For Cooling Water Treatment," Bulletin 154, Sep. 1988.
Nalco Chemical Co., "Systems Technology For Automated Cooling Water Control," Bulletin 156, Oct. 1988.
Nalco Chemical Co., "Automated Monitoring and Control Feed Systems Designed To Help You Optimize Your Total Wet End Program," Chem Mate™, Bulletin 230, Apr. 1993.
J. Richardson, et al., "A New On-Line Monitoring And Control Capability For Cooling Water Programs," Cooling Tower Institute 1993 Annual Meeting, Technical Paper No. TP93-10, pp. 1 to 18 (1993).

* cited by examiner

*Primary Examiner*—Peter A. Hruskoci
(74) *Attorney, Agent, or Firm*—Edward O. Yonter; Thomas M. Breininger

(57) ABSTRACT

A method to control a cooling water system based on the rate of consumption of fluorescent polymer is described and claimed. The method includes providing a cooling water system and a water treatment product including at least one fluorescent polymer and a fluorescent tracer. Measuring the fluorescence of the fluorescent polymer and calculating its rate of consumption provides a way of determining whether to adjust one or more operating parameters in the cooling water system.

2 Claims, No Drawings

CONTROL OF COOLING WATER SYSTEM USING RATE OF CONSUMPTION OF FLUORESCENT POLYMER

FIELD OF THE INVENTION

The present invention relates to a method for controlling cooling water systems based on calculated information.

BACKGROUND OF THE INVENTION

A cooling water system comprises a cooling tower, heat exchangers, pumps and all necessary piping to move water through the system. Control of a cooling water system is based on balancing the desire to run the cooling water system at the highest concentration cycles possible without incurring detrimental scaling, corrosion, fouling or microbiological control situations.

A concentration cycle is defined for a specific species as:

$$\frac{\text{Specific Species Level in Cooling Water Tower}}{\text{Specific Species Level in Make-Up Water}}$$

For example, when the specific species is the calcium ion ($Ca^{+2}$) and a cooling water system is running at 500 ppm $Ca^{+2}$ with 150 ppm $Ca^{+2}$ in the makeup water, the cooling water system is running at 3.3 concentration cycles. In operating a cooling water system it is desirable to achieve the maximum number of concentration cycles to avoid unnecessary loss of water in blowdown as well as unnecessary overfeeding of treatment chemicals including but not limited to, treatment polymers. The maximum concentration cycles for a cooling water system are limited by the undesirable events, such as scaling and corrosion, which occur when the amount of specific species in the cooling water tower reaches a certain level, such that the species contributes to these problems.

There are several currently known ways used to control the concentration cycles in cooling water systems. Controlling the concentration cycles is typically done by controlling the flow rate of "fresh" water (from one or more sources) known as make-up water into the system and by controlling the main flow rate out of the system, referred to as blowdown. In order to control makeup water flow, a pump or valve controls the flow of make-up water into the cooling tower and a level controller is typically used in the cooling tower reservoir or "sump". The level controller is linked to the make-up water pump or valve and when the water in the sump decreases to a point lower than the setpoint for the level controller the make-up water pump or valve is activated.

Conductivity is the typical method of blowdown control. For purposes of this patent application, conductivity is defined as the measurement of electrical conductivity of water with electrical conductivity being present in the water due to ionic species being present in the water. Conductivity can be used to control bleed of blowdown because conductivity can readily be used to estimate the overall amount of ionic species present in the water and a simple controller can be set to open a valve or pump and start blowdown when the conductivity of the reservoir water reaches above a certain setpoint.

There are limits to how useful conductivity is for control of a cooling water system as conductivity is nothing more than an indirect measure of the scaling tendency of the water as indicated by the amount of ionic species present. Small amounts of scaling species such as phosphate ions do not add measurably to the conductivity, but can result in significant scaling events. Similarly, if the ratio of scaling species present in the water to the non-scaling species changes over time, blowdown control based on conductivity is an inadequate means of controlling a cooling tower. If the ratio increases, scaling can result. If the ratio decreases, the cooling tower is operated at less than optimal cycles of concentration resulting in wastage of water and chemicals used to treat the system and resulting in other problems such as corrosion. Another concern with conductivity based control in calcium carbonate systems is that above the scaling threshold, the cooling tower can act as a "lime softener". In these situations, as calcium carbonate precipitates, the system conductivity does not change proportionally to tower cycles resulting in-sever scaling problems. It is understood in the art of cooling water that conductivity alone cannot be relied upon as the sole analytical based method for control of a cooling tower.

Alternatively, a timer can control bleed of blowdown without really measuring any of the specific species in the water. In addition to or in place of the above control schemes, water flow meters on the make-up and blowdown can be used, in conjunction with a microprocessor controller to do an overall cooling water mass balance.

A problem with these known control schemes, is that when the blowdown is controlled by conductivity and the make-up is controlled by a level controller, if the composition of the usual make-up water is variable, or if there are alternate sources of make-up water that are significantly different from the usual make-up water source, or if there are alternative sources of blowdown that are unaccounted for, level controllers and conductivity cannot account for all events that are occurring in the system. In these cases, the cooling water system is typically controlled by the operator being conservative with the conductivity setpoint which thus causes extra undesirable expense due to non-optimal use of treatment chemicals and water.

Many cooling water systems use treatment products to control undesirable events such as scaling, corrosion, fouling and microbiological growth. These treatment products comprise polymers and other materials and are known to people of ordinary skill in the art of cooling water systems. A cooling water control system can be set up to feed treatment product based on either a bleed/feed mechanism where the action of blowdown triggers a chemical feed pump or valve that feeds treatment product; or, in the alternative, the cooling water control system feeds treatment product based on timers using a "feeding schedule" or flow meters on the make-up water line trigger the pumping of treatment product based on a certain amount of make-up water being pumped. A limitation of these control methods is that none of these systems measure the treatment product concentration directly online, so if there is a mechanical problem, for example, if a pump fails, a drum empties, or high, low or unknown blowdown occurs, system volume changes or makeup water quality changes; the correct treatment product concentration is not maintained. Because this problem is common, typically cooling water systems are either overfed to ensure the level of treatment product in the system does not drop too low as a result of high variability in product dosage or the treatment product is unknowingly underfed. Both overfeeding and underfeeding of treatment product are undesirable due to cost and performance drawbacks.

One aspect of known control schemes is an inert fluorescent chemical being added to the cooling water system in a known proportion to the active component of the treatment product feed and the use of a fluorometer to monitor the fluorescent signal of the inert fluorescent chemical. This is commercially available as TRASAR® from Nalco Company, 1601 W. Diehl Road, Naperville Ill. 60563 (630) 305-1000. When using TRASAR® the fluorescent signal of the inert fluorescent chemical is then used to determine whether the desired amount of treatment product is present in the cooling tower and the operating parameters, such as blowdown, can then optionally be adjusted to ensure that the desired amount of treatment product is present.

Many current cooling towers use inert fluorescent tracers to control the treatment product level in the system and also use a conductivity controller to measure the conductivity in the water.

Cooling towers that use both inert fluorescent tracer(s) and conductivity typically use the following types of information in order to control the tower. For example, a cooling tower with typical makeup water having: 150 ppm $Ca^{+2}$, 75 ppm $Mg^{+2}$, and 100 ppm "M alkalinity"; with a conductivity of 600 microsiemens per centimeter ($\mu$S/cm) is set to run at 500 ppm $Ca^{+2}$. In order to operate within acceptable levels, the cycles of concentration for this cooling water system are 3.3 (calculated by dividing 500 by 150). Running the system at 500 ppm $Ca^{+2}$ corresponds to a conductivity setpoint of 3.3 times 600 or 1980 $\mu$S/cm. When the conductivity exceeds this setpoint the system is configured to automatically blowdown a portion of "concentrated" cooling water ("concentrated" referring to system water with an unacceptably high level of ions) which is replaced with "fresh" makeup water (where "fresh" is defined as having a lower level of scaling ions than the "concentrated" cooling water). This decreases the conductivity and hardness ($Ca^{+2}$ and $Mg^{+2}$) ions via dilution. Dilution also reduces the amount of inert fluorescent tracer chemical in the system. Decreasing the amount of inert fluorescent tracer in the system decreases the fluorescent signal from the inert fluorescent tracer. When the fluorescent signal from tracer decreases, the tracer control system is set up to feed a fresh mixture of treatment product and inert fluorescent tracer chemical to makeup for the decrease in fluorescence that was lost in the blowdown.

A known method of controlling product feed to a cooling water system involving the use of another aspect of tracer technology. This method involves using a treatment product containing a polymer that has been "tagged" with a fluorescent moiety. These tagged polymers are not inert, rather, they are supposed to be consumed as they function to treat whatever performance-related condition it is that they are designed to treat. Thus, by measuring the fluorescent signal of the tagged polymer it is possible to determine the active polymer in the system and by knowing this to be able to determine the amount of consumption of the tagged polymer. By knowing the amount of consumption of the tagged polymer it is possible to use that information to control the feeding of new treatment product containing tagged polymer.

A reference in this area is entitled "The Chemical Treatment of Cooling Water", Second Edition by James W. McCoy, ®1983 by Chemical Publishing Co., Inc., see Chapter 1, Principles of Open Recirculating Cooling Water Systems, pgs. 1–20, Chapter III, Scaling and Fouling, pgs. 48–81, Chapter VI, Operating Procedures, pgs. 198–226, and Appendix, Glossary, pgs. 268–273.

Another reference in this area is entitled "High Cycle Cooling Tower Operation: Hurdles and Solutions", Hoots et al, pp. 388–397 which was presented at the $60^{th}$ Annual Meeting of the International Water Conference held on Oct. 18–20, 1999.

U.S. Pat. No. 6,280,635, is entitled Autocycle Control Of Cooling Water Systems. This patent issued on Aug. 28, 2001 and it describes and claims an autocycle method to control a cooling water system comprising the steps of:

a) adding a treatment product to said cooling water system, with said treatment product comprising inert fluorescent tracer and fluorescent polymer in a set proportion;

b) providing a sufficient number of fluorometers;

c) using said sufficient number of fluorometers to measure the fluorescent signal of said inert fluorescent tracer and the fluorescent signal of said fluorescent polymer in the water from the cooling water system;

d) using these measured fluorescent signals from step c) to determine the amount of said fluorescent polymer present in said cooling water system;

e) comparing the amount of said fluorescent polymer present to the amount of fluorescent polymer being fed into the system to determine the consumption of said fluorescent polymer; and f) using said consumption of said fluorescent polymer to control the concentration cycles of said cooling water system, with the proviso that said control is implemented by linking any or all of the following parameters i) the flowrate of the make-up water to the cooling water system;

ii) the flowrate of the treatment product comprising inert fluorescent tracer and tagged treatment polymer;

iii) frequency and amount of blowdown flowrate from the cooling water system;

iv) overall water flowrate through the cooling tower;

v) overall volume of water in the cooling tower; and vi) composition of makeup water;

to the consumption of said fluorescent polymer, with the provisos that:

α) the minimum flowrate of treatment product comprising inert fluorescent tracer and tagged treatment polymer must be sufficient to supply the cooling water system with the requisite amount of tagged treatment product; and β) when control is implemented by linking flowrates the flowrates are balanced.

New methods and techniques for control of cooling water systems are always desirable.

SUMMARY OF THE INVENTION

The first aspect of the instant claimed invention is a one-drum method to control a cooling water system comprising the steps of:

(1) determining the rate of consumption of a fluorescent polymer in the water of a cooling water system, wherein the rate of consumption is calculated at discrete intervals during a learning time period, using a Fouling Index equation, or a Scale Index equation or a Tower Scale Index equation, comprising the steps of a) providing a cooling water system;

b) providing a water treatment product, (i) wherein said water treatment product comprises at least one fluorescent polymer, at least one inert fluorescent tracer and optionally other water treatment chemicals, (ii) wherein said fluorescent polymer is present in said water treatment product in a known proportion to all of the other ingredients in the water treatment product,
(iii) wherein said inert fluorescent tracer is present in said water treatment product in a known proportion to all of the other ingredients in the water treatment product,
(iv) wherein both said fluorescent polymer and said inert fluorescent tracer have detectable fluorescent signals and said fluorescent polymer has a detectable fluorescent signal that is distinct as compared to the detectable fluorescent signal of said inert fluorescent tracer such that the fluorescent signals of both the inert fluorescent tracer and the fluorescent polymer can both be detected in the water of the same cooling water system;

c) adding said water treatment product to the water of said cooling water system,
(i) wherein said water treatment product is added to the water in a discontinuous way, and
(ii) wherein discrete intervals of time pass between the addition of each amount of water treatment product;

d) providing one or more fluorometers;

e) using said one or more fluorometers to measure the fluorescent signal of said inert fluorescent tracer and the fluorescent signal of said fluorescent polymer in the water from the cooling water system, wherein said measurements used in the calculations of step g) take place during the interval of time that occurs between each new addition of water treatment product to the water of said cooling water system;

f) using the measured fluorescent signals from step e) to determine the concentration of fluorescent polymer and concentration of inert fluorescent tracer present in the water of said cooling water, g) repeating steps e) and f) at discrete intervals in order to calculate the rate of consumption of fluorescent polymer during intervals of a learning time period by using an equation selected from the group comprising the Fouling Index equation, the Scale Index equation, and the Tower Scale Index equation as follows:

$$FIL = [A/(t1f - t10)] \times [\ln\{LIT(f)/LIT(0)\} - \ln\{LTP(f)/LTP(0)\}]; \quad (i)$$

where FIL is the Fouling Index calculated for an interval of time during the learning time period,
A is a constant=1,
t1f=Time at end of interval,
t10=Time at start of interval,
LIT(0)=Concentration of inert fluorescent tracer at start of the interval;
LIT(f)=Concentration of inert fluorescent tracer at end of the interval;
LTP(0)=Concentration of fluorescent polymer at start of the interval;
LTP(F) Concentration of fluorescent polymer at end of the interval; or $$SIL = [\{B \times LTP(0)\}/\text{interval time}] \times [LIT(t)/LIT(0) - LTP(t)/LTP(0)]; \quad (ii)$$

where SIL is the Scale Index calculated for an interval of time during the learning time period,
B is a constant=1,000,000 or 100,000;
interval time is the time, in units of minutes, of the discrete interval of time when measurements are being taken,
LTP(0) is the fluorescent polymer concentration at the start of the interval,
LIT(0) is the inert fluorescent tracer concentration at the start of the interval,
LTP(t) is the fluorescent polymer concentration at the end of the interval, and
LIT(t) is the inert fluorescent tracer concentration at the end of the interval; or $$TSIL = -C \times SL(t) \times 60; \quad (iii)$$

where TSIL is the Tower Scale Index calculated for an interval of time during learning time period,
C is a constant=1,000,000 or 100,000,
SL(t) is the slope of ln[LTP(t)/LIT(t)] versus time curve, in units of (1/seconds), where the slope is calculated for an interval of time during the learning time period;

(2) Calculating the average rate of consumption of fluorescent polymer during the learning time period by adding all the FILs or all the SILs or all the TSILs calculated in step 1 and dividing by the number of times the FILs or SILs or TSILs were calculated over the entire learning time period, wherein this calculation leads to an FILa being calculated or to an SILa being calculated or to a TSILa being calculated, wherein FILa is the average Fouling Index during the learning time period and SILa is the average Scale Index during the learning time period and TSILa is the average Tower Scale Index during the learning time period;

(3) Calculating the rate of consumption of fluorescent polymer during an evaluation time period, wherein measurements used in the calculations take place during the intervals of time that occur between each new addition of water treatment product to the water of said cooling water system, wherein said calculations are done by using an equation selected from the group comprising the Fouling Index equation for an evaluation time period, the Scale Index equation for an evaluation time period, and the Tower Scale Index equation for an evaluation time period as follows:

$$FIE = [A/(tef - te0)] \times [\ln\{EIT(f)/EIT(0)\} - \ln\{ETP(f)/ETP(0)\}]; \quad (i)$$

where FIE refers to the Fouling Index calculated during the evaluation time period,
A is a constant=1, and is chosen to be the same during the learning time period and the evaluation time period;
tef=Time at end of evaluation period,
te0=Time at start of evaluation period,
EIT(0)=Concentration of inert fluorescent tracer at start of evaluation period;
EIT(f)=Concentration of inert fluorescent tracer at end of evaluation period;
ETP(0)=Concentration of fluorescent polymer at start of evaluation period;
ETP(f)=Concentration of fluorescent polymer at end of evaluation period;

$$SIE = [B \times ETP(0)]/\text{evaluation time} \times [EIT(t)/EIT(0) - ETP(t)/ETP(0)]; \quad (ii)$$

where SIE is the Scale Index for the Evaluation Time Period,
B is a constant=1,000,000 or 100,000, and is chosen to be the same during the learning time period and the evaluation time period;
evaluation time is the time in units of minutes of the evaluation,
ETP(0) is the fluorescent polymer concentration at the start of the evaluation time, EIT(0) is the inert fluorescent tracer concentration at the start of the evaluation time, ETP(t) is the fluorescent polymer concentration at the end of the evaluation time, and EIT(t) is the inert fluorescent tracer concentration at the end of the evaluation time;

$$TSIE = -C \cdot SE(t) \times 60; \quad \text{(iii)}$$

where TSIE is Tower Scale Index for the Evaluation Period,

C=constant=1,000,000 or 100,000, and is chosen to be the same during the learning time period and the evaluation time period;

SE(t) is the slope of LN[ETP(t)/EIT(t)] versus time curve in units of (1/seconds), where the slope is calculated throughout the evaluation time period; and 4) Comparing the rate of consumption of fluorescent polymer during an evaluation time period to the previously determined, in step (2) average rate of consumption of fluorescent polymer during the learning time period for the water in the cooling water system in the following ways;

(i) wherein if FIE=FILa, then the rate of consumption of fluorescent polymer is the same during the evaluation period as it was during the learning period; if FIE>FILa, the rate of consumption of fluorescent polymer is greater during the evaluation period than it was during the learning period; if FIE<FILa, the rate of consumption of fluorescent polymer is less during the evaluation period than it was during the learning period;

(ii) wherein if SIE=SILa, then the rate of consumption of fluorescent polymer is the same during the evaluation period as it was during the learning period; if SIE>SILa, the rate of consumption of fluorescent polymer is greater during the evaluation period than it was during the learning period; if SIE<SILa, the rate of consumption of fluorescent polymer is less during the evaluation period than it was during the learning period;

(iii) wherein if TSIE=TSILa, then the rate of consumption of fluorescent polymer is the same during the evaluation period as it was during the learning period; if TSIE>TSILa, the rate of consumption of fluorescent polymer is greater during the evaluation period than it was during the learning period; if TSIE<TSILa, the rate of consumption of fluorescent polymer is less during the evaluation period than it was during the learning period;

(iv) calculating the NVincent Scale Index or NVincent Tower Scale Index as follows:

$$NSI = D \times [SIE - SIL]/SIL(SD),$$

$$NTSI = D \times [TSIE - TSIL]/TSIL(SD);$$

where NSI is the NVincent Scale Index and NTSI is the NVincent Tower Scale Index, where D is a constant=10;

TSIE and SIE and TSIL and SIL are as defined previously, and

TSIL(SD) and SIL(SD) are the standard deviations of TSIL and SIL values, respectively, as calculated during the learning time period;

wherein if NSI or NTSI=0, then the rate of consumption of fluorescent polymer is the same during the evaluation period as it was during the learning period; if NSI or NTSI>0, the rate of consumption of fluorescent polymer is greater during the evaluation period than it was during the learning period; if NSI or NTSI<0, the rate of consumption of fluorescent polymer is less during the evaluation period than it was during the learning period; and optionally 5) adjusting the operating parameters of said cooling water system in order to maintain the rate of consumption of fluorescent polymer at the desired rate of consumption of fluorescent polymer for the water in the cooling water system.

The second aspect of the instant claimed invention is a two-drum method to control a cooling water system comprising the steps of:

(1) determining the rate of consumption of a fluorescent polymer in the water of a cooling water system, wherein the rate of consumption is calculated at discrete intervals during a learning time period, using a Fouling Index equation, or a Scale Index or a Tower Scale Index equation, comprising the steps of a) providing a cooling water system;

b) providing a corrosion inhibitor product,
  (i) wherein said corrosion inhibitor product comprises one or more compounds selected from the group of known corrosion inhibitor chemicals and an inert fluorescent tracer, known as iftcip,
  (ii) wherein said iftcip, has been added to said corrosion inhibitor product in a known proportion, c) providing a scale control product,
  (i) wherein said scale control product comprises at least one fluorescent polymer and optionally other scale control chemicals;
  (ii) wherein said fluorescent polymer is present in said scale control product in a known proportion to all of the other ingredients in the scale control product;
  (iii) wherein both of said fluorescent polymer and said iftcip have detectable fluorescent signals and said fluorescent polymer has a detectable fluorescent signal that is distinct as compared to the detectable fluorescent signal of iftcip, such that the fluorescent signals of iftcip and that of the fluorescent polymer can both be detected in the water of the same cooling water system, d) adding said scale control product and said corrosion inhibitor product to the water of said cooling water system;
  (i) wherein said scale control product is added to the water in a discontinuous way, and
  (ii) wherein said corrosion inhibitor product is added to the water in a discontinuous way, and
  (iii) wherein discrete intervals of time pass between the addition of each amount of scale control product, and
  (iv) wherein discrete intervals of time pass between the addition of each amount of corrosion inhibitor product;

e) providing one or more fluorometers;

f) using said one or more fluorometers to measure the fluorescent signal of said fluorescent polymer and to measure the fluorescent signal of iftcip in the water from the cooling water system, wherein said measurements used in the calculations of step h) take place during the interval of time that occurs when no new scale control product is being added and also when no new corrosion inhibitor product is being added to the water of the industrial water system;

g) using these measured fluorescent signals from step f) to determine the amount of fluorescent polymer and the amount of iftcip present in the water of said cooling water system;

h) repeating steps f) and g) at discrete intervals in order to calculate the rate of consumption of fluorescent polymer during a learning time period by using an equation selected from the group comprising the Fouling Index equation, the Scale Index equation and the Tower Scale Index equation as follows:

$$\text{FIL}=[A/(tlf-tl0)]\times[\ln\{LIT(f)/LIT(0)\}-\ln\{LTP(f)/LTP(0)\}]; \quad \text{(i)}$$

where FIL is the Fouling Index calculated for an interval of time during the learning time period,
A is a constant=1,
tlf=Time at end of interval,
tl0 Time at start of interval,
LIT(0)=Concentration of iftcip at start of the interval;
LIT(f)=Concentration of iftcip at end of the interval;
LTP(0)=Concentration of fluorescent polymer at start of the interval;
LTP(f)=Concentration of fluorescent polymer at end of the interval; or $$SIL=[\{B \times LTP(0)\}/\text{interval time}]\times[LIT(t)/LIT(0)-LTP(t)/LTP(0)]; \quad \text{(ii)}$$

where SIL is the Scale Index calculated for an interval of time during the learning time period,
B is a constant=1,000,000 or 100,000,
interval time is the time, in units of minutes, of the discrete interval of time when measurements are being taken,
LTP(0) is the fluorescent polymer concentration at the start of the interval,
LIT(0) is the iftcip concentration at the start of the interval,
LTP(t) is the fluorescent polymer concentration at the end of the interval and
LIT(t) is the iftcip concentration at the end of the interval; or $$TSIL=-C \times SL(t) \times 60; \quad \text{(iii)}$$

where TSIL is the Tower Scale Index calculated for an interval of time during the learning time period,
where C is a constant=1,000,000 or 100,000,
SL(t) is the slope of ln[LTP(t)/LIT(t)] versus time curve, in 1/seconds, where the slope is calculated for an interval of time during the learning time period;

(2) Calculating the average rate of consumption of fluorescent polymer during the learning time period by adding all the FILs or all the SILs or all the TSILs calculated in step 1 and dividing by the number of times the FILs or SILs or TSILs were calculated over the entire learning time period, wherein this calculation leads to a FILa being calculated or to a SILa being calculated or to a TSILa being calculated, wherein FILa is the average Fouling Index during the learning time period and SILa is the average Scale Index during the learning time period and TSILa is the average Tower Scale Index during the learning time period;

(3) Calculating the rate of consumption of fluorescent polymer during an evaluation time period, wherein measurements used in the calculations take place during the intervals of time that occur between each new addition of water treatment product to the water of said cooling water system, wherein said calculations are done by using an equation selected from the group comprising the Fouling Index equation for an evaluation time period, the Scale Index equation for an evaluation time period, or the Tower Scale Index equation for an evaluation time period as follows:

$$\text{FIE}=[A/(tef-te0)]\times[\ln\{EIT(f)/EIT(0)\}-\ln\{ETP(f)/ETP(0)\}]; \quad \text{(i)}$$

where FIE refers to the Fouling Index calculated during the evaluation time period,
A is a constant=1, and is chosen to be the same during the learning time period and the evaluation time period;
tef=Time at end of evaluation period,
te0=Time at start of evaluation period,
EIT(0)=Concentration of iftcip at start of evaluation period;
EIT(f)=Concentration of iftcip at end of evaluation period;
ETP(0)=Concentration of fluorescent polymer at start of evaluation period;
ETP(f)=Concentration of fluorescent polymer at end of evaluation period;

$$SIE=[B \times ETP(0)]/\text{evaluation time}\times[EIT(t)/EIT(0)-ETP(t)/ETP(0)]; \quad \text{(ii)}$$

where SIE is the Scale Index for the Evaluation Time Period,
B is a constant=1,000,000 or 100,000, and is chosen to be the same during the learning time period and the evaluation time period;
evaluation time is the time in units of minutes of the evaluation;
ETP(0) is the fluorescent polymer concentration at the start of the evaluation time;
EIT(0) is the iftcip concentration at the start of the evaluation time;
ETP(t) is the fluorescent polymer concentration at the end of the evaluation time and
EIT(t) is the iftcip concentration at the end of the evaluation time;

$$TSIE=-C \times SE(t) \times 60; \quad \text{(iii)}$$

where TSIE is Tower Scale Index for the Evaluation Period,
C is a constant=1,000,000 or 100,000, and is chosen to be the same during the learning time period and the evaluation time period;
SE(t) is the slope of LN[ETP(t)/EIT(t)] versus time curve in units of 1/seconds, where the slope is calculated throughout the evaluation time period;

4) Comparing the rate of consumption of fluorescent polymer during an evaluation time period to the previously determined, in step (2) average rate of consumption of fluorescent polymer during the learning time period for the water in the cooling water system in the following ways:

(i) wherein if FIE=FILa, then the rate of consumption of fluorescent polymer is the same during the evaluation period as it was during the learning period; if FIE>FILa, the rate of consumption of fluorescent polymer is greater during the evaluation period than it was during the learning period; if FIE<FILa, the rate of consumption of fluorescent polymer is less during the evaluation period than it was during the learning period;

(ii) wherein if SIE=SILa, then the rate of consumption of fluorescent polymer is the same during the evaluation period as it was during the learning period; if SIE>SILa, the rate of consumption of fluorescent polymer is greater during the evaluation period than it was during the learning period; if SIE<SILa, the rate of consumption of fluorescent polymer is less during the evaluation period than it was during the learning period;

(iii) wherein if TSIE=TSILa, then the rate of consumption of fluorescent polymer is the same during the evaluation period as it was during the learning period; if TSIE>TSILa, the rate of consumption of fluorescent polymer is greater during the evaluation period than it was during the learning period; if TSIE<TSILa, the rate of consumption of fluorescent polymer is less during the evaluation period than it was during the learning period;

(iv) calculating the NVincent Scale Index or NVincent Tower Scale Index as follows:

$$NSI=D\times[SIE-SIL]/SIL(SD),$$

$$NTSI=D\times[TSIE-TSIL]/TSIL(SD);$$

Where NSI is the NVincent Scale Index and NTSI is the NVincent Tower Scale Index;
where D is a constant=10;
TSIE and SIE and TSIL and SIL are as defined previously, and
TSIL(SD) and SIL(SD) are the standard deviations of TSIL and
SIL, respectively, as calculated during the learning time period;

wherein if NSI or NTSI=0, then the rate of consumption of fluorescent polymer is the same during the evaluation period as it was during the learning period; if NSI or NTSI>0, the rate of consumption of fluorescent polymer is greater during the evaluation period than it was during the learning period; if NSI<0, the rate of consumption of fluorescent polymer is less during the evaluation period than it was during the learning period;
and optionally 5) adjusting the operating parameters of said cooling water system in order to maintain the rate of consumption of fluorescent polymer at the desired rate of consumption of fluorescent polymer for the water in the cooling water system.

DETAILED DESCRIPTION OF THE PRESENTLY PREFERRED EMBODIMENTS

For purposes of this patent application, the following terms have the indicated definitions:

"consumption" refers to the difference between the amount of fluorescent polymer being added to the water of the cooling water system and the amount of fluorescent polymer present in the water of the cooling water system;

"HEDP" refers to 1 hydroxyethylidene-1,1-diphosphonic acid;

"inert" refers to the fact that an inert fluorescent tracer is not appreciably or significantly affected by any other chemistry in the cooling water system, or by the other system parameters such as metallurgical composition, microbiological activity, biocide concentration, heat changes or overall heat content. To quantify what is meant by "not appreciably or significantly affected", this statement means that an inert fluorescent compound has no more than a 10% change in its fluorescent signal, under conditions normally encountered in cooling water systems. Conditions normally encountered in cooling water systems are known to people of ordinary skill in the art of cooling water systems.

"one-drum" method: In the one-drum method, the fluorescent polymer and inert fluorescent tracer are mixed together, along with other optional scale control chemicals and optional corrosion control chemicals, into a "water treatment product" which water treatment product is added to the water of the cooling water system.

"PBTC" refers to 2-phosphonobutane-1,2,4-tricarbioxylic acid;

"PCT" refers to a Pilot Cooling Tower;

"scale control product" refers to a chemical that has the effect of controlling the amount of scale that deposits onto the surfaces of the equipment used in a cooling water system.

"fluorescent polymers" are defined as a polymer that either is naturally fluorescent or a polymer that has been "tagged" with a fluorescent moiety wherein said polymer is capable of functioning as a scale inhibitor in a cooling water system.

"two-drum" method. In the "two-drum" method of the instant claimed invention, the fluorescent polymer is added to the water of the cooling water system as part of a "scale control product" comprising fluorescent polymer and other optional scale control chemicals. A corrosion inhibitor product is added separately from the scale control product. The corrosion inhibitor product comprises one or more corrosion inhibitors and an inert fluorescent tracer, abbreviated "iftcip". The scale control product and the corrosion inhibitor product are added separately to the water of the cooling water system, hence the "two-drum" descriptor for this method.

The first aspect of the instant claimed invention is a one-drum method to control a cooling water system by determining the rate of consumption of a fluorescent polymer in the water of a cooling water system, wherein the rate of consumption is calculated at discrete intervals during a learning time period, using a Fouling Index equation, or a Scale Index equation or a Tower Scale Index equation.

The method of the instant claimed invention will work in all known cooling water systems. These include open recirculating cooling water systems, closed cooling water systems and once-through cooling water systems.

The water treatment product used in this aspect contains at least one fluorescent polymer, at least one inert fluorescent tracer and optionally other water treatment chemicals, but does not contain biocide, which is fed separately;

(v) wherein said fluorescent polymer is present in said water treatment product in a known proportion to all of the other ingredients in the water treatment product, (vi) wherein said inert fluorescent tracer is present in said water treatment product in a known proportion to all of the other ingredients in the water treatment product, (vii) wherein both said fluorescent polymer and said inert fluorescent tracer have detectable fluorescent signals and said fluorescent polymer has a detectable fluorescent signal that is distinct as compared to the detectable fluorescent signal of said inert fluorescent tracer such that the fluorescent signals of both the inert fluorescent tracer and the fluorescent polymer can both be detected in the water of the same cooling water system.

For purposes of this patent application, fluorescent polymers are defined either as a naturally fluorescent polymer or as a polymer that has been "tagged" with a fluorescent moiety. To be useful in the method of the instant claimed invention, the fluorescent polymer must be capable of functioning as a scale inhibitor in a cooling water system and it must have a detectable fluorescent signal that is different than the detectable fluorescent signal of the inert fluorescent tracer(s) being used.

Fluorescent polymers suitable for use in the instant claimed invention are selected from the group described and claimed in U.S. Pat. Nos. 5,128,419; 5,171,450; 5,216,086; 5,260,386 and 5,986,030; U.S. Pat. No. 6,344,531 entitled, FLUORESCENT WATER-SOLUBLE POLYMERS; U.S. Pat. No. 6,312,644 entitled, "FLUORESCENT MONOMERS AND POLYMERS CONTAINING SAME FOR USE IN COOLING WATER SYSTEMS"; and U.S. Pat. No. 6,645,428 entitled, FLUORESCENT MONOMERS AND FLUORESCENT POLYMERS CONTAINING SAME FOR USE IN COOLING WATER SYSTEMS, where all patents described in this paragraph are herein incorporated by reference, in their entirety.

Preferred fluorescent polymers are selected from the group comprising:

59.9 mole % acrylic acid/20 mole % acrylamide/20 mole % N-(sulfomethyl)acrylamide/0.1 mole % 8-(4-vinylbenzyloxy)-1,3,6-pyrenetrisulfonic acid, trisodium salt;

39.9 mole % acrylic acid/30 mole % acrylamide/30 mole % N-(sulfomethyl)acrylamide/0.1 mole % 8-(3-vinylbenzyloxy)-1,3,6-pyrenetrisulfonic acid, trisodium salt;

59.8 mole % acrylic acid/20 mole % acrylamide/20 mole % N-(sulfomethyl)acrylamide/0.2 mole % 4-methoxy-N-(3-N',N'-dimethylaminopropyl) naphthalimide vinylbenzyl chloride quaternary salt;

39.8 mole % acrylic acid/30 mole % acrylamide/30 mole % N-(sulfomethyl)acrylamide/0.2 mole % 4-methoxy-N-(3-N',N'-dimethylaminopropyl) naphthalimide vinylbenzyl chloride quaternary salt;

59.9 mole % acrylic acid/20 mole % acrylamide/20 mole % N-(sulfomethyl)acrylamide/0.1 mole % 4-methoxy-N-(3-N',N'-dimethylaminopropyl) naphthalimide 2-hydroxy-3-allyloxy propyl quaternary salt;

39.8 mole % acrylic acid/30 mole % acrylamide/30 mole % N-(sulfomethyl)acrylamide/0.2 mole % 4-methoxy-N-(3-N',N'-dimethylaminopropyl) naphthalimide 2-hydroxy-3-allyloxy propyl quaternary salt;

80.8 mole % acrylic acid/19 mole % sodium acrylamidomethylpropane sulfonic acid/0.2 mole % 4-methoxy-N-(3-N',N'-dimethylaminopropyl)naphthalimide 2-hydroxy-3-allyloxy propyl quaternary salt;

These fluorescent polymer scale control products are either commercially available from Nalco or are capable of being synthesized by a person of ordinary skill in the art of organic chemistry.

It is understood in the art of scale control chemicals that scale control chemicals are typically divided into two different types, based on the type of scale that they inhibit. There are scale control chemicals that control the deposition of calcium phosphate and scale control chemicals that control the deposition of calcium carbonate.

Typically scale control products for calcium phosphate are the fluorescent polymers previously described. Preferred scale control products for calcium phosphate are tagged polymers. It is known that even though the fluorescent polymers previously described are primarily effective as calcium phosphate scale inhibitors, when calcium carbonate scale is inadequately inhibited by calcium carbonate scale inhibitors such as HEDP and PBTC, consumption of the fluorescent polymer is observed, indicating at least partial activity as a calcium carbonate dispersant on the part of the fluorescent polymer.

Typically scale control products for calcium carbonate scale are selected from the group comprising phosphonates such as 1-hydroxyethylidene-1,1-diphosphonic acid (abbreviated "HEDP"), 2-Phosphonobutane-1,2,4-tricarboxylic acid (abbreviated "PBTC"), aminotri(methylenephosphonic acid (abbreviated "AMP"), hexamethylene diamine tetra (methylene phosphonic acid (abbreviated "HMDTMP") and polyamino polyether methylenephosphonic acid (abbreviated "PAPEMP"), organic polymers such as polyacrylic acid, polyacrylates, polymaleic acid, maleic anhydride/ethyl acrylate/vinyl acrylate terpolymer and alkyl epoxy carboxylate (abbreviated "AEC"), phosphinocarboxylic acids, such as phosphinosuccinate oligomers (abbreviated as "PSO"), and phosphonocarboxylic acids, such as phosphonocarboxylic (sulfonated) copolymer (abbreviated "POCA", sold as Belclene 494), Preferred calcium carbonate inhibitors include HEDP and PBTC.

Inert fluorescent tracers suitable for use in the instant claimed invention, with either the water treatment product of the first aspect of the instant claimed invention or with the corrosion inhibitor product of the second aspect of the instant claimed invention include the following:

1,3,6,8-pyrenetetrasulfonic acid, tetrasodium salt (CAS Registry No. 59572-10-0), monosulfonated anthracenes and salts thereof, including, but not limited to:

2-anthracenesulfonic acid sodium salt (CAS Registry No. 16106-40-4);

disulfonated anthracenes and salts thereof, see U.S. patent application Ser. No. 10/631,606, filed Jul. 31, 2003, entitled "Use of Disulfonated Anthracenes as Inert Fluorescent Tracers", now pending, which is incorporated by reference in its entirety, including, but not limited to:

1,5-anthracenedisulfonic acid (CAS Registry No. 61736-91-2), 2,6-anthracenedisulfonic acid (CAS Registry No. 61736-95-6), 1,8-anthracenedisulfonic acid (CAS Registry No. 61736-92-3);

4-dibenzofuransulfonic acid (CAS Registry No. 42137-76-8), 3-dibenzofuransulfonic acid (CAS Registry No. 215189-98-3), 1,5-naphthalenedisulfonic acid, disodium salt (hydrate) (CAS Registry No. 1655-29-4), aka 1,5-NDSA hydrate, sulfonated stilbene-triazole fluorescent brighteners and salts thereof, including, but not limited to:

benzenesulfonic acid, 2,2'-(1,2-ethenediyl)bis[5-(4-phenyl-2H-1,2,3-triazol-2-yl)-, dipotassium salt, (CAS Registry No. 52237-03-3), aka Phorwite BHC 766, 2,2'-stilbenedisulfonic acid, 4,4'-bis(4-phenyl-2H-1,2,3-triazol-2-yl)-, disodium salt, (CAS Registry No. 23743-28-4), aka Phorwite BHC.

All of these inert fluorescent tracers are either commercially available from Nalco or may be synthesized using techniques known to persons of ordinary skill in the art of organic chemistry.

In formulating the water treatment product the fluorescent polymer is present in the water treatment product in a known proportion to all of the other ingredients in the water treatment product and the inert fluorescent tracer is present in the water treatment product in a known proportion to all of the other ingredients in the water treatment product.

In formulating the water treatment product used in the first aspect of the instant claimed invention it is understood that there are no biocides present in the water treatment product. If biocides are added to the cooling water, they are added separately.

In selecting the fluorescent polymer and inert fluorescent tracer to be used together it is necessary to select them such that the fluorescent polymer has a detectable fluorescent signal that is separate from the detectable fluorescent signal of the inert fluorescent tracer. People of ordinary skill in the art of fluorometry know how to use a fluorometer to detect the fluorescent signal of a material such that they can run the necessary tests to determine which inert fluorescent tracer should be combined with which fluorescent polymer.

This is the "one-drum" method of the instant claimed invention. In the one-drum method, the fluorescent polymer and inert fluorescent tracer are mixed together into a water treatment product, which water treatment product may contain additional water treatment chemicals such as corrosion inhibitors or microbiocides.

The next step in this method is to add the water treatment product comprising fluorescent polymer and inert fluorescent tracer and optional other water treatment chemicals to the water of the cooling water system. This can be done using equipment and techniques known to ordinary people of skill in the art.

The amount of fluorescent polymer, on an "active polymer" basis added to the water of a cooling water system is from about 0.1 ppm to about 1000 ppm, preferably from about 0.1 ppm to about 100 ppm and most preferably from about 0.1 ppm to about 20 ppm.

The amount of inert fluorescent tracer added to the water of a cooling water system is from about 0.01 ppm to about 1000 ppm, preferably from about 0.03 ppm to about 10 ppm and most preferably from about 0.05 ppm to about 1.0 ppm.

The overall amount of water treatment product added is based on the "requirement" for this product in the water of the cooling water system. A person of ordinary skill in the art of cooling water knows how to determine the requirement for water treatment product in the water of the cooling water system.

The next step in the method is to provide one or more fluorometers. Suitable fluorometers for use to detect the fluorescent signal of the fluorescent polymer are commercially available and are selected from the group consisting of the fluorometer described and claimed in U.S. Pat. No. 6,369,894 entitled, "MODULAR FLUOROMETER AND METHOD OF USING SAME TO DETECT ONE OR MORE FLUOROPHORES", issued Apr. 9, 2002, which is herein incorporated by reference in its entirety. This modular fluorometer is available from Nalco.

Other fluorometers suitable for use in the method of the instant claimed invention are the modified TRASAR 8000 fluorometer ("hand-held"); TRASAR 700 fluorometer ("Bench-top"); modified TRASAR 3000; TRASAR Xe-2 Controller; which are all available from Nalco; and the In-Line fluorometer probe, known as the Cyclops 7 fluorometer (optical filters would need to be chosen to match the tracer used) available from Turner Designs, 845 Maude Ave., Sunnyvale, Calif. 94085 ((408) 749–0994). The preferred fluorometer is the modular fluorometer. In order to make use of these fluorometers the excitation and emission optical filters will need to be chosen to match up with the fluorescent signal properties of the fluorescent polymer.

Suitable fluorometers for use to detect the inert fluorescent tracer are commercially available and are selected from the group consisting of the fluorometer described and claimed in U.S. Pat. No. 6,369,894 entitled, "MODULAR FLUOROMETER AND METHOD OF USING SAME TO DETECT ONE OR MORE FLUOROPHORES", issued Apr. 9, 2002, which is herein incorporated by reference in its entirety. This modular fluorometer is available from Nalco.

Other fluorometers suitable for use to detect the inert fluorescent tracer in the method of the instant claimed invention are the TRASAR 8000 fluorometer ("hand-held"); TRASAR 700 fluorometer ("Bench-top"); TRASAR 3000 (for pyrene tetrasulfonic acid); modified TRASAR 3000 (for anthracene disulfonic acid disodium salt tracer); TRASAR Xe-2 Controller; and the Interchangeable Tip—pen Cell Fluorometer, which is described and claimed in U.S. patent application Ser. No. 10/769,631, filed Jan. 30, 2004, and is incorporated by reference in its entirety. All of the these fluorometers are available from Nalco. Additional fluorometers include the In-Line fluorometer probe, known as the Cyclops 7 fluorometer (optical filters would need to be chosen to match the tracer used) available from Turner Designs, 845 Maude Ave., Sunnyvale, Calif. 94085 ((408) 749–0994). The preferred fluorometer is the Modular Fluorometer.

In order to make use of these fluorometers, it is known to persons of ordinary skill in the art of fluorometry that the excitation and emission optical filters will need to be chosen to match up with the fluorescent signal properties of the inert fluorescent tracer and the fluorescent polymer.

The Trasar® Xe-Controller, Trasar 3000 and Modular Fluorometer all have flow cells that permit on-line continuous monitoring of a liquid. The other fluorometers are "grab sample" fluorometers that do not allow for continuous on-line monitoring. In conducting the method of the instant claimed invention, it is preferred to use a fluorometer that permits on-line, continuous monitoring of fluorescent signals.

The one or more suitable fluorometers are then set up and used to measure the fluorescent signal of the inert fluorescent tracer and the fluorescent signal of the fluorescent polymer in the water from the cooling water system.

It is critical to the workability of the method of the instant claimed invention that the measurements that are used are only those measurements done during the interval of time between the addition of new water treatment product to the water of the cooling water system. Therefore, throughout the first aspect of the method of the instant claimed invention, it is assumed that all measurements that are used in the calculations took place during an interval of time in which no water treatment product is being added to the water of the cooling water system. Also, this means that throughout the second aspect of the method of the instant claimed invention, it is assumed that all measurements that are used in the calculations took place during an interval of time in which no corrosion inhibitor product is being added and in which no scale control product is being added to the water of the cooling water system.

After measuring the fluorescent signals, the measured fluorescent signals are used to calculate the amount of fluorescent polymer and the amount of inert fluorescent tracer present in the water of said cooling water system.

After these amounts are known it is possible to start the calculations for the rate of consumption of fluorescent polymer. This calculation of rate of consumption of scale control product is done during two different time periods. The first time period is known as the "learning time period" and the measurements taken during intervals within this time period are used to calculate the "normal" or "routine" rate of consumption of fluorescent polymer.

In the following equations the variables "tlf=Time at end of interval during learning period" and "tl0=Time at start of interval during learning period" are used. Thus, the interval during the learning time period itself is tlf–tl0. The amount of time in the interval is the amount of time between the addition of more water treatment chemical because in order for this method to be operable no measurements can be used that are taken when more water treatment chemical is being added.

The total amount of time in the learning time period is based on the understood "normal" operating conditions of the cooling water system. How long the total amount of time in the learning time period is and how many intervals where measurements are taken within the learning time period are required is a decision that can be made by a person of ordinary skill in the art of operating a cooling water system.

The next step in the method of the instant claimed invention is to calculate the rate of consumption of fluorescent polymer during intervals of the learning time period by using an equation selected from the group comprising the Fouling Index equation, the Scale Index equation, and the Tower Scale Index equation as follows:

$$FIL = [A/(tlf-tl0)] \times [\ln\{LIT(f)/LIT(0)\} - \ln\{LTP(f)/LTP(0)\}]; \quad (i)$$

where FIL is the Fouling Index calculated for an interval of time during the learning time period,
A is a constant=1,
tlf=Time at end of interval,
tl0=Time at start of interval,
LIT(0)=Concentration of inert fluorescent tracer at start of the interval;
LIT(f)=Concentration of inert fluorescent tracer at end of the interval;
LTP(0)=Concentration of fluorescent polymer at start of the interval;
LTP(f)=Concentration of fluorescent polymer at end of the interval; or $$SIL = [\{B \times LTP(0)\}/\text{interval time}] \times [LIT(t)/LIT(0) - LTP(t)/LTP(0)]; \quad (ii)$$

where SIL is the Scale Index calculated for an interval of time during the learning time period,
B is a constant=1,000,000 or 100,000;
interval time is the time, in units of minutes, of the discrete interval of time when measurements are being taken,
LTP(0) is the fluorescent polymer concentration at the start of the interval,
LIT(0) is the inert fluorescent tracer concentration at the start of the interval,
LTP(t) is the fluorescent polymer concentration at the end of the interval, and
LIT(t) is the inert fluorescent tracer concentration at the end of the interval; or $$TSIL = -C \times SL(t) \times 60; \quad (iii)$$

where TSIL is the Tower Scale Index calculated for an interval of time during learning time period,
C is a constant=1,000,000 or 100,000,
SL(t) is the slope of $\ln[LTP(t)/LIT(t)]$ versus time curve, in units of (1/seconds), where the slope is calculated for an interval of time during the learning time period;

The next step in the method of the first aspect of the instant claimed invention is to calculate the average rate of consumption of fluorescent polymer during the learning time period by adding all the FILs or all the SILs or all the TSILs calculated previously and divided by the number of times the FILs or SILs or TSILs were calculated over the entire learning time period, wherein this calculation leads to an FILa being calculated or to an SILa being calculated or to a TSILa being calculated, wherein FILa is the average Fouling Index during the learning time period and SILa is the average Scale Index during the learning time period and TSILa is the average Tower Scale Index during the learning time period;

This average rate of consumption during the learning time period is then compared to the rate of consumption during an "evaluation" time period. It is understood that the measurements used in the calculations of this step take place during the intervals of time that occur between each new addition of water treatment product to the water of said cooling water system.

In the following equations the variables "tef=Time at end of evaluation period" and "te0=Time at start of evaluation period" are used. Thus, the evaluation time period itself is tef-te0. The amount of time in the evaluation time period is based on desired operating conditions of the cooling water system. It is a decision that can be made by a person of ordinary skill in the art of operating a cooling water system to select how long the evaluation time period needs to be for their cooling water system.

The calculations of the rate of consumption of fluorescent polymer during an evaluation time period are done by using an equation selected from the group comprising the Fouling Index equation for an evaluation time period, the Scale Index equation for an evaluation time period, and the Tower Scale Index equation for an evaluation time period as follows:

$$FIE\ [A/(tef-te0)] \times [\ln\{EIT(f)/EIT(0)\} - \ln\{ETP(f)/ETP(0)\}]; \quad (i)$$

where FIE refers to the Fouling Index calculated during the evaluation time period,
A is a constant=1, and is chosen to be the same during the learning time period and the evaluation time period;
tef=Time at end of evaluation period,
te0=Time at start of evaluation period,
EIT(0)=Concentration of inert fluorescent tracer at start of evaluation period;
EIT(f)=Concentration of inert fluorescent tracer at end of evaluation period;
ETP(0)=Concentration of fluorescent polymer at start of evaluation period;
ETP(f)=Concentration of fluorescent polymer at end of evaluation period;

$$SIE = [B \times ETP(0)]/\text{evaluation time} \times [EIT(t)/EIT(0) - ETP(t)/ETP(0)]; \quad (ii)$$

where SIE is the Scale Index for the Evaluation Time Period,
B is a constant=1,000,000 or 100,000, and is chosen to be the same during the learning time period and the evaluation time period;
evaluation time is the time in units of minutes of the evaluation,
ETP(0) is the fluorescent polymer concentration at the start of the evaluation time,
EIT(0) is the inert fluorescent tracer concentration at the start of the evaluation time,
ETP(t) is the fluorescent polymer concentration at the end of the evaluation time, and
EIT(t) is the inert fluorescent tracer concentration at the end of the evaluation time;

$$TSIE = -C \times SE(t) \times 60; \quad (iii)$$

where TSIE is Tower Scale Index for the Evaluation Period,
C=constant=1,000,000 or 100,000, and is chosen to be the same during the learning time period and the evaluation time period;

SE(t) is the slope of LN[ETP(t)/EIT(t)] versus time curve in units of (1/seconds), where the slope is calculated throughout the evaluation time period.

After the calculation has been done during the evaluation time period, the next step is to compare the average rate of consumption of fluorescent polymer during the learning time period with the rate of consumption of fluorescent polymer during the evaluation time period. The comparison is done as follows:

When the fouling index equation is used, if FIE=FILa, then the rate of consumption of fluorescent polymer is the same during the evaluation period as it was during the learning period; if FIE>FILa, the rate of consumption of fluorescent polymer is greater during the evaluation period than it was during the learning period; if FIE<FILa, the rate of consumption of fluorescent polymer is less during the evaluation period than it was during the learning period;

When the scaling index equation is used, if SIE=SILa, then the rate of consumption of fluorescent polymer is the same during the evaluation period as it was during the learning period; if SIE>SILa, the rate of consumption of fluorescent polymer is greater during the evaluation period than it was during the learning period; if SIE<SILa, the rate of consumption of fluorescent polymer is less during the evaluation period than it was during the learning period;

When the scaling index equation is used, if TSIE=TSILa, then the rate of consumption of fluorescent polymer is the same during the evaluation period as it was during the learning period; if TSIE>TSILa, the rate of consumption of fluorescent polymer is greater during the evaluation period than it was during the learning period; if TSIE<TSILa, the rate of consumption of fluorescent polymer is less during the evaluation period than it was during the learning period;

Another type of comparison can be done by calculating what is known as the NVincent Scale Index or NVincent Tower Scale Index as follows:

$$NSI = D \times [SIE-SIL]/SIL(SD),$$

$$NTSI = D \times [TSIE-TSIL]/TSIL(SD);$$

where NSI is the NVincent Scale Index and NTSI is the NVincent Tower Scale Index,
where D is a constant=10;
TSIE and SIE and TSIL and SIL are as defined previously, and
TSIL(SD) and SIL(SD) are the standard deviations of TSIL and SIL values, respectively, calculated during the learning time period;
wherein if NSI or NTSI=0, then the rate of consumption of fluorescent polymer is the same during the evaluation period as it was during the learning period; if NSI or NTSI>0, the rate of consumption of fluorescent polymer is greater during the evaluation period than it was during the learning period; if NSI<0, the rate of consumption of fluorescent polymer is less during the evaluation period than it was during the learning period.

If the rate of consumption of fluorescent polymer is higher or lower during the evaluation time period than it is during the learning time period, then an optional step in the method of the instant claimed invention is that the operator of the cooling water system can adjust the operation of the cooling water system to adjust the rate of consumption of fluorescent polymer to the value that it was during the learning period.

The second aspect of the instant claimed invention is a two-drum method to control a cooling water system where a corrosion inhibitor product is provided and the inert fluorescent tracer is mixed with the corrosion inhibitor product in a known proportion before the corrosion inhibitor product is added to the water of the cooling water system. In the "two-drum" method of the instant claimed invention, the fluorescent polymer is added to the water of the cooling water system separately from the inert fluorescent tracer, which is added simultaneously with a corrosion inhibitor product, hence the "two-drum" identifier for this technique.

The corrosion inhibitor product is one or more compounds selected from the group of known corrosion inhibitor chemicals. Corrosion inhibitor products suitable for use in the instant claimed invention include the following orthophosphate, polyphosphates, pyrophosphate, zinc, phosphinosuccinate oligomers abbreviated as "PSO", molybdate, chromate, Belcor 575 (from Rhodia), and Bricorr 288 (from Rhodia). The preferred corrosion inhibitor product is PSO, available from Nalco.

In formulating the corrosion inhibitor product used in the second aspect of the instant claimed invention it is understood that there are no biocides present in the water treatment product. If biocides are added to the cooling water, they are added separately.

These corrosion inhibitor products are either commercially available from Nalco or are capable of being synthesized by a person of ordinary skill in the art of organic chemistry.

The scale control product comprises fluorescent polymer as previously defined and optional scale control chemicals. In formulating the scale control product used in the second aspect of the instant claimed invention it is understood that there are no biocides present in the water treatment product. If biocides are added to the cooling water, they are added separately.

The scale control product and the corrosion inhibitor product are added to the water of said cooling water system. The amount of scale control product and the amount of corrosion inhibitor product added is based on the "requirement" for both of these products in the water of the cooling water system and a person of ordinary skill in the art of cooling water knows how to determine the requirement for corrosion inhibitor product and scale control product in the water of the cooling water system.

After addition of the two products the method proceeds as previously described in the first aspect of the instant claimed invention.

The use of a method of determine the rate of consumption is a valuable method for controlling a cooling water system because it is independent of the initial concentration of either fluorescent species, it can be used when the inert fluorescent tracer and fluorescent polymer are in separate products, the "2-drum" method, and the impact of background fluorescent signal(s) are minimized.

What is claimed is:
1. A one-drum method to control a cooling water system by determining a rate of consumption of at least one fluorescent polymer in the water of the cooling water system, said method comprising the steps of:
  (1) calculating the rate of consumption of the fluorescent polymer in the water of the cooling water system at discrete intervals during a learning time period, said calculation comprising the steps of:
    (a) providing the cooling water system;
    (b) providing a water treatment product,
      (i) wherein said water treatment product includes the at least one fluorescent polymer, at least one inert fluorescent tracer and optionally other water treatment chemicals,

(ii) wherein said fluorescent polymer is present in said water treatment product in a known proportion to all of the other ingredients, if any, in the water treatment product, (iii) wherein said inert fluorescent tracer is present in said water treatment product in a known proportion to all of the other ingredients, if any, in the water treatment product, and (iv) wherein both said fluorescent polymer and said inert fluorescent tracer have detectable fluorescent signals and said fluorescent polymer has a detectable fluorescent signal that is distinct as compared to the detectable fluorescent signal of said inert fluorescent tracer such that the fluorescent signals of both the inert fluorescent tracer and the fluorescent polymer can both be detected in the water of the same cooling water system;

(c) adding said water treatment product to the water of said cooling water system, (i) wherein said water treatment product is added to the water in a discontinuous way, and (ii) wherein discrete intervals of time pass between the addition of each amount of water treatment product;

(d) providing one or more fluorometers;

(e) using said one or more fluorometers to measure the fluorescent signal of said inert fluorescent tracer and the fluorescent signal of said fluorescent polymer in the water from the cooling water system;

(f) using the measured fluorescent signals from step (e) to determine the concentration of fluorescent polymer and concentration of inert fluorescent tracer present in the water of said cooling water, (g) repeating steps (e) and (f) at discrete intervals, including time intervals which occur between each new addition of water treatment product, in order to calculate the rate of consumption of fluorescent polymer during intervals of the learning time period by using an equation selected from the group consisting of: a Fouling Index equation for the learning time period, a Scale Index equation for the learning time period, and a Tower Scale Index equation for for the learning time period as follows:

$$FIL = [A/(tlf-tl0)] \times [\ln\{LIT(f)/LIT(0)\} - \ln\{LTP(f)/LTP(0)\}]; \quad \text{(i)}$$

where FIL is the Fouling Index calculated for an interval of time during the learning time period, A is a constant=1, tlf=Time at end of interval, tl0=Time at start of interval, LIT(0)=Concentration of inert fluorescent tracer at start of the interval;

LIT(f)=Concentration of inert fluorescent tracer at end of the interval;

LTP(0)=Concentration of fluorescent polymer at start of the interval; and

LTP(f)=Concentration of fluorescent polymer at end of the interval; or $$SIL = [\{B \times LTP(0)\}/\text{interval time}] \times [LIT(t)/LIT(0) - LTP(t)/LTP(0)]; \quad \text{(ii)}$$

where SIL is the Scale Index calculated for an interval of time during the learning time period, B is a constant=1,000,000 or 100,000;

interval time is the time, in units of minutes, of the discrete interval of time when measurements are being taken, LTP(0) is the fluorescent polymer concentration at the start of the interval, LIT(0) is the inert fluorescent tracer concentration at the start of the interval, LTP(t) is the fluorescent polymer concentration at the end of the interval, and LIT(t) is the inert fluorescent tracer concentration at the end of the interval; or $$TSIL = -C \times SL(t) \times 60; \quad \text{(iii)}$$

where TSIL is the Tower Scale Index calculated for an interval of time during learning time period, C is a constant=1,000,000 or 100,000, SL(t) is the slope of $\ln[LTP(t)/LIT(t)]$ versus time curve, in units of (1/seconds), where the slope is calculated for an interval of time during the learning time period;

(2) Calculating an average rate of consumption of the fluorescent polymer during the learning time period by adding all the FILs or all the SILs or all the TSILs calculated in step (1) and dividing by the number of times the FILs or SILs or TSILs were calculated over the entire learning time period, wherein this calculation leads to an FILa being calculated or to an SILa being calculated or to a TSILa being calculated, wherein FILa is the average Fouling Index during the learning time period and SILa is the average Scale Index during the learning time period and TSILa is the average Tower Scale Index during the learning time period;

(3) Calculating the rate of consumption of the fluorescent polymer during an evaluation time period, wherein measurements used in the calculations take place during the intervals of time that occur between each new addition of water treatment product to the water of said cooling water system, wherein said calculations are done by using an equation selected from the group consisting of: a Fouling Index equation for the evaluation time period, a Scale Index equation for the evaluation time period, and a Tower Scale Index equation for the evaluation time period as follows:

$$FIE = [A/(tef-te0)] \times [\ln\{EIT(f)/EIT(0)\} - \ln\{ETP(f)/ETP(0)\}]; \quad \text{(i)}$$

where FIE refers to the Fouling Index calculated during the evaluation time period, A is a constant=1, tef=Time at end of evaluation period, te0=Time at start of evaluation period, EIT(0)=Concentration of inert fluorescent tracer at start of evaluation period;

EIT(f)=Concentration of inert fluorescent tracer at end of evaluation period;

ETP(0)=Concentration of fluorescent polymer at start of evaluation period; and

ETP(f)=Concentration of fluorescent polymer at end of evaluation period;

$$SIE = [B \times ETP(0)]/\text{evaluation time} \times [EIT(t)/EIT(0) - ETP(t)/ETP(0)]; \quad \text{(ii)}$$

where SIE is the Scale Index for the Evaluation Time Period,

B is a constant=1,000,000 or 100,000, and is chosen to be the same during the learning time period and the evaluation time period;

evaluation time is the time in units of minutes of the evaluation,

ETP(0) is the fluorescent polymer concentration at the start of the evaluation time, EIT(0) is the inert fluorescent tracer concentration at the start of the evaluation time, ETP(t) is the fluorescent polymer concentration at the end of the evaluation time, and EIT(t) is the inert fluorescent tracer concentration at the end of the evaluation time;

$$TSIE = -C \times SE(t) \times 60; \qquad (iii)$$

where TSIE is Tower Scale Index for the Evaluation Period,
C=constant=1,000,000 or 100,000, and is chosen to be the same during the learning time period and the evaluation time period;

SE(t) is the slope of ln[ETP(t)/EIT(t)] versus time curve in units of (1/seconds), where the slope is calculated throughout the evaluation time period;

(4) Comparing the rate of consumption of the fluorescent polymer during the evaluation time period to the previously determined, in step (2), average rate of consumption of fluorescent polymer during the learning time period for the water in the cooling water system in the following ways:

(i) wherein if FIE=FILa, then the rate of consumption of fluorescent polymer is the same during the evaluation period as it was during the learning period; if FIE>FILa, the rate of consumption of fluorescent polymer is greater during the evaluation period than it was during the learning period; if FIE<FILa, the rate of consumption of fluorescent polymer is less during the evaluation period than it was during the learning period;

(ii) wherein if SIE=SILa, then the rate of consumption of fluorescent polymer is the same during the evaluation period as it was during the learning period; if SIE>SILa, the rate of consumption of fluorescent polymer is greater during the evaluation period than it was during the learning period; if SIE<SILa, the rate of consumption of fluorescent polymer is less during the evaluation period than it was during the learning period;

(iii) wherein if TSIE=TSILa, then the rate of consumption of fluorescent polymer is the same during the evaluation period as it was during the learning period; if TSIE>TSILa, the rate of consumption of fluorescent polymer is greater during the evaluation period than it was during the learning period; if TSIE<TSILa, the rate of consumption of fluorescent polymer is less during the evaluation period than it was during the learning period;

(iv) calculating an NVincent Scale Index or an NVincent Tower Scale Index as follows:

$$NSI = D \times [SIE - SIL]/SIL(SD),$$

$$NTSI = D \times [TSIE - TSIL]/TSIL(SD);$$

where NSI is the NVincent Scale Index and NTSI is the NVincent Tower Scale Index,
where D is a constant=10;
TSIE and SIE and TSIL and SIL are as defined previously, and
TSIL(SD) and SIL(SD) are the standard deviations of TSIL and SIL values, respectively, as calculated during the learning time period;

wherein if NSI or NTSI=0, then the rate of consumption of fluorescent polymer is the same during the evaluation period as it was during the learning period; if NSI or NTSI>0, the rate of consumption of fluorescent polymer is greater during the evaluation period than it was during the learning period; if NSI or NTSI<0, the rate of consumption of fluorescent polymer is less during the evaluation period than it was during the learning period; and (5) adjusting one or more operating parameters of said cooling water system in order to maintain a desired rate of consumption of the fluorescent polymer, including adjusting the amount of provided water treatment product.

2. A two-drum method to control a cooling water system by determining a rate of consumption of at least one fluorescent polymer in the water of the cooling water system, said method comprising the steps of:

(1) calculating the rate of consumption of the fluorescent polymer in the water of the cooling water system at discrete intervals during a learning time period, said calculation comprising the steps of:

(a) providing the cooling water system;

(b) providing a corrosion inhibitor product,
(i) wherein said corrosion inhibitor product includes one or more corrosion inhibitors and an inert fluorescent tracer, known as iftcip, and
(ii) wherein said iftcip, has been added to said corrosion inhibitor product in a known proportion, (c) providing a scale control product,
(i) wherein said scale control product includes the at least one fluorescent polymer and optionally other scale control chemicals;
(ii) wherein said fluorescent polymer is present in said scale control product in a known proportion to all of the other ingredients, if any, in the scale control product;
(iii) wherein both of said fluorescent polymer and said iftcip have detectable fluorescent signals and said fluorescent polymer has a detectable fluorescent signal that is distinct as compared to the detectable fluorescent signal of iftcip, such that the fluorescent signals of the iftcip and the fluorescent polymer can both be detected in the water of the same cooling water system, (d) adding said scale control product and said corrosion inhibitor product to the water of said cooling water system;
(i) wherein said scale control product is added to the water in a discontinuous way, and
(ii) wherein said corrosion inhibitor product is added to the water in a discontinuous way, and
(iii) wherein discrete intervals of time pass between the addition of each amount of scale control product, and
(iv) wherein discrete intervals of time pass between the addition of each amount of corrosion inhibitor product;

(e) providing one or more fluorometers;

(f) using said one or more fluorometers to measure the fluorescent signal of said fluorescent polymer and to measure the fluorescent signal of the iftcip in the water from the cooling water system;

(g) using the measured fluorescent signals from step (f) to determine the amount of fluorescent polymer and the amount of iftcip present in the water of said cooling water system;

(h) repeating steps (f) and (g) at discrete intervals, including time intervals which occur when no new scale control product is being added and when no new corrosion inhibitor product is being added, in order to calculate the rate of consumption of fluorescent polymer during the learning time period by using an equation selected from the group consisting of: a Fouling Index equation for the learning time period, a Scale Index equation for the learning time period, and a Tower Scale Index equation for the learning time period as follows:

$$FIL = [A/(tlf-tl0)] \times [\ln\{LIT(f)/LIT(0)\} - \ln\{LTP(f)/LTP(0)\}]; \qquad (i)$$

where FIL is the Fouling Index calculated for an interval of time during the learning time period,
A is a constant=1,
tlf=Time at end of interval,
tl0=Time at start of interval,
LIT(0)=Concentration of iftcip at start of the interval;
LIT(f) Concentration of iftcip at end of the interval;
LTP(0)=Concentration of fluorescent polymer at start of the interval; and
LTP(f)=Concentration of fluorescent polymer at end of the interval; or $$SIL = [\{B \times LTP(0)\}/\text{interval time}] \times [LIT(t)/LIT(0) - LTP(t)/LTP(0)]; \qquad (ii)$$

where SIL is the Scale Index calculated for an interval of time during the learning time period,
B is a constant=1,000,000 or 100,000,
interval time is the time, in units of minutes, of the discrete interval of time when measurements are being taken,
LTP(0) is the fluorescent polymer concentration at the start of the interval,
LIT(0) is the iftcip concentration at the start of the interval,
LTP(t) is the fluorescent polymer concentration at the end of the interval, and
LIT(t) is the iftcip concentration at the end of the interval; or $$TSIL = -C \times SL(t) \times 60; \qquad (iii)$$

where TSIL is the Tower Scale Index calculated for an interval of time during the learning time period,
where C is a constant=1,000,000 or 100,000,
SL(t) is a slope of $\ln[LTP(t)/LIT(t)]$ versus time curve, in 1/seconds, where the slope is calculated for an interval of time during the learning time period;

(2) Calculating an average rate of consumption of fluorescent polymer during the learning time period by adding all the FILs or all the SILs or all the TSILs calculated in step (1) and dividing by the number of times the FILs or SILs or TSILs were calculated over the entire learning time period, wherein this calculation leads to a FILa being calculated or to a SILa being calculated or to a TSILa being calculated, wherein FILa is the average Fouling Index during the learning time period and SILa is the average Scale Index during the learning time period and TSILa is the average Tower Scale Index during the learning time period;

(3) Calculating the rate of consumption of the fluorescent polymer during an evaluation time period, wherein measurements used in the calculations take place during the intervals of time that occur between each new addition of water treatment product to the water of said cooling water system, wherein said calculations are done by using an equation selected from the group consisting of: a Fouling Index equation for the evaluation time period, a Scale Index equation for the evaluation time period, or a Tower Scale Index equation for the evaluation time period as follows:

$$FIE = [A/(tef-te0)] \times [\ln\{EIT(f)/EIT(0)\} - \ln\{ETP(f)/ETP(0)\}]; \qquad (i)$$

where FIE refers to the Fouling Index calculated during the evaluation time period,
A is a constant=1,
tef=Time at end of evaluation period,
te0=Time at start of evaluation period,
EIT(0)=Concentration of iftcip at start of evaluation period;
EIT(f)=Concentration of iftcip at end of evaluation period;
ETP(0)=Concentration of fluorescent polymer at start of evaluation period;
ETP(f)=Concentration of fluorescent polymer at end of evaluation period;

$$SIE = [B \times ETP(0)]/\text{evaluation time} \times [EIT(t)/EIT(0) - ETP(t)/ETP(0)]; \qquad (ii)$$

where SIE is the Scale Index for the Evaluation Time Period,
B is a constant=1,000,000 or 100,000, and is chosen to be the same during the learning time period and the evaluation time period;
evaluation time is the time in units of minutes of the evaluation;
ETP(0) is the fluorescent polymer concentration at the start of the evaluation time;
EIT(0) is the iftcip concentration at the start of the evaluation time;
ETP(t) is the fluorescent polymer concentration at the end of the evaluation time, and
EIT(t) is the iftcip concentration at the end of the evaluation time;

$$TSIE = -C \times SE(t) \times 60; \qquad (iii)$$

where TSIE is Tower Scale Index for the Evaluation Period,
C is a constant=1,000,000 or 100,000, and is chosen to be the same during the learning time period and the evaluation time period;
SE(t) is the slope of $\ln[ETP(t)/EIT(t)]$ versus time curve in units of 1/seconds,
where the slope is calculated throughout the evaluation time period;

(4) Comparing the rate of consumption of fluorescent polymer during the evaluation time period to the previously determined, in step (2), average rate of consumption of fluorescent polymer during the learning time period for the water in the cooling water system in the following ways:
(i) wherein if FIE=FILa, then the rate of consumption of fluorescent polymer is the same during the evaluation period as it was during the learning period; if FIE>FILa, the rate of consumption of fluorescent polymer is greater during the evaluation period than it was during the learning period; if FIE<FILa, the rate of consumption of fluorescent polymer is less during the evaluation period than it was during the learning period;

(ii) wherein if SIE=SILa, then the rate of consumption of fluorescent polymer is the same during the evaluation period as it was during the learning period; if SIE>SILa, the rate of consumption of fluorescent polymer is greater during the evaluation period than it was during the learning period; if SIE<SILa, the rate of consumption of fluorescent polymer is less during the evaluation period than it was during the learning period;

(iii) wherein if TSIE=TSILa, then the rate of consumption of fluorescent polymer is the same during the evaluation period as it was during the learning period; if TSIE>TSILa, the rate of consumption of fluorescent polymer is greater during the evaluation period than it was during the learning period; if TSIE<TSILa, the rate of consumption of fluorescent polymer is less during the evaluation period than it was during the learning period;

(iv) calculating an NVincent Scale Index or an NVincent Tower Scale Index as follows:

$$NSI = D \times [SIE - SIL]/SIL(SD),$$

$$NTSI = D \times [TSIE - TSIL]/TSIL(SD);$$

Where NSI is the NVincent Scale Index and NTSI is the NVincent Tower Scale Index;

where D is a constant=10;

TSIE and SIE and TSIL and SIL are as defined previously, and

TSIL(SD) and SIL(SD) are the standard deviations of TSIL, and

SIL, respectively, as calculated during the learning time period;

wherein if NSI or NTSI=0, then the rate of consumption of the fluorescent polymer is the same during the evaluation period as it was during the learning period; if NSI or NTSI>0, the rate of consumption of fluorescent polymer is greater during the evaluation period than it was during the learning period; if NSI<0, the rate of consumption of fluorescent polymer is less during the evaluation period than it was during the learning period; and (5) adjusting one or more operating parameters of said cooling water system in order to maintain a desired rate of consumption of the fluorescent polymer for the water in the cooling water system, including adjusting one or more of the amount of water treatment product, corrosion inhibitor product, and scale control product.

* * * * *